United States Patent
Liss et al.

(10) Patent No.: US 10,947,466 B2
(45) Date of Patent: Mar. 16, 2021

(54) METHOD FOR REDUCING NOX EMISSIONS FROM GASIFICATION POWER PLANTS

(71) Applicant: Mobil Tensor Holdings LLC, Pompano Beach, FL (US)

(72) Inventors: Barry Liss, Pompano Beach, FL (US); Brandon Ruf Wilson, Bothell, WA (US); Bary Wallace Wilson, Coconut Creek, FL (US)

(*) Notice: Subject to any disclaimer, the term of this patent is extended or adjusted under 35 U.S.C. 154(b) by 0 days.

(21) Appl. No.: 16/420,287

(22) Filed: May 23, 2019

(65) Prior Publication Data
US 2019/0276757 A1 Sep. 12, 2019

Related U.S. Application Data

(62) Division of application No. 15/417,908, filed on Jan. 27, 2017, now Pat. No. 10,329,500.

(Continued)

(51) Int. Cl.
*C10J 3/00* (2006.01)
*F23G 5/00* (2006.01)
(Continued)

(52) U.S. Cl.
CPC .............. *C10J 3/005* (2013.01); *B01D 45/16* (2013.01); *B01D 46/02* (2013.01); *B01D 53/40* (2013.01); *B01D 53/86* (2013.01); *B03C 3/00* (2013.01); *C10J 3/485* (2013.01); *C10J 3/721* (2013.01); *C10J 3/723* (2013.01); *C10J 3/84* (2013.01); *C10J 3/845* (2013.01); *C10K 1/003* (2013.01); *C10K 1/026* (2013.01); *C10K 1/34* (2013.01); *C10K 3/005* (2013.01); *F01N 3/2066* (2013.01); *F01N 5/02* (2013.01); *F23G 5/006* (2013.01); *F23G 5/0276* (2013.01); *F23G 5/16* (2013.01); *F23G 5/20* (2013.01); *F23G 5/46* (2013.01);
(Continued)

(58) Field of Classification Search
CPC ................................ Y02E 20/12; Y02E 50/30
See application file for complete search history.

(56) References Cited

U.S. PATENT DOCUMENTS 3,874,116 A * 4/1975 White ................. C10K 1/004
  48/209
5,262,577 A * 11/1993 Velcich ................ C10B 53/00
  201/17

(Continued)

*Primary Examiner* — Laert Dounis
(74) *Attorney, Agent, or Firm* — Ingram IP Law, P.A.

(57) ABSTRACT

A method is provided for thermally processing waste to produce steam and generate energy while minimizing air pollutants in a staged thermal reactor. The method includes gasifying the waste to convert the waste to a fuel gas and a substantially carbon free, inert, granulated, sintered mineral ash and reforming the fuel gas auto-thermally to minimize creation of nitrogen oxide when the fuel gas is combusted. The method further includes burning the reformed fuel gas to minimize creation of nitrogen oxide in a flame region of a fuel gas burner and recirculating cooled flue gas to control oxygen content and temperature during the reforming operation and the burning operation. In one example, reforming the fuel gas converts non-molecular nitrogen species into molecular nitrogen in an auto-thermal non-catalytic reformer unit by decomposition reactions promoted by a prevailing reducing gas atmosphere.

10 Claims, 6 Drawing Sheets

Related U.S. Application Data (60) Provisional application No. 62/388,396, filed on Jan. 28, 2016.

(51) Int. Cl.

| | | |
|---|---|---|
| *F23G 5/027* | (2006.01) | |
| *F23G 5/46* | (2006.01) | |
| *C10K 3/00* | (2006.01) | |
| *B01D 53/86* | (2006.01) | |
| *C10K 1/00* | (2006.01) | |
| *F23G 5/16* | (2006.01) | |
| *C10K 1/34* | (2006.01) | |
| *C10J 3/84* | (2006.01) | |
| *C10J 3/72* | (2006.01) | |
| *B01D 45/16* | (2006.01) | |
| *B01D 46/02* | (2006.01) | |
| *B01D 53/40* | (2006.01) | |
| *B03C 3/00* | (2006.01) | |
| *C10J 3/48* | (2006.01) | |
| *C10K 1/02* | (2006.01) | |
| *F01N 3/20* | (2006.01) | |
| *F01N 5/02* | (2006.01) | |
| *F23G 5/20* | (2006.01) | |
| *B03C 3/017* | (2006.01) | |
| *B09B 3/00* | (2006.01) | |

(52) U.S. Cl.
CPC ............ *B03C 3/017* (2013.01); *B09B 3/0083* (2013.01); *C10J 2300/0946* (2013.01); *C10J 2300/0956* (2013.01); *C10J 2300/1653* (2013.01); *C10J 2300/1671* (2013.01); *C10J 2300/1687* (2013.01); *C10J 2300/1838* (2013.01); *C10J 2300/1869* (2013.01); *F23G 5/00* (2013.01); *F23G 2201/40* (2013.01); *F23G 2206/00* (2013.01); *F23G 2206/203* (2013.01); *F23G 2900/00001* (2013.01); *Y02A 50/20* (2018.01); *Y02E 20/12* (2013.01); *Y02P 20/129* (2015.11); *Y02P 30/20* (2015.11); *Y02W 30/20* (2015.05)

(56) References Cited

U.S. PATENT DOCUMENTS

| | | | |
|---|---|---|---|
| 8,246,700 B1* | 8/2012 | Kutsin | C10K 1/024 48/197 R |
| 2004/0079087 A1* | 4/2004 | Chandran | C10K 1/002 60/781 |
| 2008/0021121 A1* | 1/2008 | Norbeck | C10K 1/16 518/704 |
| 2008/0275278 A1* | 11/2008 | Clark | C10J 3/721 585/240 |
| 2010/0158792 A1* | 6/2010 | Drnevich | C10K 3/04 423/650 |
| 2010/0163396 A1* | 7/2010 | Michalek | A61L 12/00 201/25 |
| 2011/0146155 A1* | 6/2011 | Bentzen | C10J 3/34 48/89 |
| 2014/0053465 A1* | 2/2014 | Matsushita | C01B 3/36 48/111 |
| 2014/0178782 A1* | 6/2014 | Gillespie | H01M 8/0618 429/425 |
| 2015/0126627 A1* | 5/2015 | Apanel | C01B 3/44 518/702 |
| 2018/0051877 A1* | 2/2018 | Liss | F23G 5/46 |

* cited by examiner

METHOD FOR REDUCING NOX EMISSIONS FROM GASIFICATION POWER PLANTS

CROSS-REFERENCE TO RELATED APPLICATIONS

This application claims priority to U.S. application Ser. No. 15/417,908 filed on Jan. 27, 2017, which claims priority to U.S. Provisional Application 62/388,396, filed on Jan. 28, 2016, the complete disclosures of which are incorporated herein by reference in their entirety.

FIELD OF THE TECHNOLOGY

The present technology relates generally to gasification systems and more particularly to multi-stage gasification systems that thermally process carbonaceous solid waste to produce exportable energy and low NOx air emissions and still more particularly to a multi-stage burner system that combusts fuel gas, produced by waste gasification, in a way that minimizes fuel NOx, prompt NOx, and thermal NOx formation using a flue gas recycling system.

BACKGROUND OF THE TECHNOLOGY

A majority of municipal solid waste ("MSW") is collected by trash trucks and transported to landfills where it is dumped into designated areas. When a dumping cell is full, it is sealed with a plastic sheet and covered in several feet of dirt. The buried MSW causes several environmental hazards as it decomposes, including generation of greenhouse gases ("GHG") such as carbon dioxide ($CO_2$) and methane ($CH_4$).

MSW includes everyday items that are discarded by the public. For example, MSW may include biodegradable waste, inert waste, combustible construction and demolition waste, composite waste, certain types of hazardous or toxic waste, biomedical waste, and/or recyclable materials. The composition of MSW may vary greatly from municipality to municipality and may change over time. The MSW may originate from residential, commercial, institutional, and/or industrial sources.

Rather than burying the MSW in landfills, the MSW may be combusted to reduce the GHG equivalent levels below those produced through burying the MSW in landfills. Furthermore, the MSW may be combusted to recover energy from the waste. The conversion of waste-to-energy ("WTE") may be performed at a WTE facility. The MSW may be sorted and shredded to produce refuse derived fuel ("RDF") that is used to fire boilers that produce steam used to generate electrical power. For example, waste incinerator systems are known to generate process steam and/or electrical power while reducing MSW volume and mass. However, conventional incinerator systems often suffer from inadequate emission controls that degrade the atmosphere with hazardous air pollutants including acid gases, volatile organic compounds, and particulate matter, including heavy metals. For example, conventional incinerator systems produce high levels of nitrogen oxides (NOx), as well as oxides of sulfur (SOX) hydrochloric acid, dioxins and furans, fine particulate matter, and toxic metals, among other undesirable byproducts.

With respect to NOx formation during combustion, the three primary NOx contributors include (1) fuel NOx, (2) prompt NOx, and (3) thermal NOx. Fuel NOx is formed during combustion when a partially decomposing component specie having a carbon-nitrogen bond is oxidized, either by oxygen or a hydroxyl species. Prompt NOx follows a similar pathway to fuel NOx with a distinction that prompt NOx is typically associated with high energy density fuels such as natural gas, with free radical formation occurring within the fuel rich region of the combustion zone flame. Thermal NOx is formed at very high temperatures associated with the high energy requirement to break a nitrogen-nitrogen triple bond and enable oxidation to a NOx specie. While the reaction rates for each of these three NOx formations are different, all NOx is formed as a function of oxygen concentration and temperature. Furthermore, conventional incinerator systems produce solid residues that require special storage arrangements to prevent un-combusted organics and heavy metal contaminants from leaching into ground water. These and other drawbacks exist with conventional incinerator technology.

DETAILED DESCRIPTION OF THE TECHNOLOGY

It will be appreciated that for simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures, and components have not been described in detail so as not to obscure the related relevant feature being described. Also, the description is not to be considered as limiting the scope of the examples described herein. The drawings are not necessarily to scale and the proportions of certain parts may have been exaggerated to better illustrate details and features of the present disclosure. Those skilled in the art with access to the teachings provided herein will recognize additional modifications, applications, and examples within the scope thereof and additional fields in which the technology would be of significant utility.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and means either, any, several, or all of the listed items. The terms "comprising," "including" and "having" are used interchangeably in this disclosure. The terms "comprising," "including" and "having" mean to include, but are not necessarily limited to the things so described.

The terms "connected" and "coupled" are not restricted to physical or mechanical connections or couplings, and can include electrical connections or couplings, whether direct or indirect. The connection can be such that the objects are permanently connected or releasably connected. The term "communicatively coupled" is defined as connected, either directly or indirectly through intervening components, and the connections are not necessarily limited to physical connections, but are connections that accommodate the transfer of data, signals, or other matter between the so-described components. The term "substantially" is defined to be essentially conforming to the thing that it "substantially" modifies, such that the thing need not be exact. For example, substantially real-time means that the occurrence may happen without noticeable delay, but may include a slight delay.

The terms "circuit," "circuitry," and "controller" may include either a single component or a plurality of components, which are either active and/or passive components and may be optionally connected or otherwise coupled together to provide the described function. The "processor" described in any of the various embodiments includes an electronic circuit that can make determinations based upon inputs and is interchangeable with the term "controller." The processor can include a microprocessor, a microcontroller, and a central processing unit, among others, of a general purpose computer, special purpose computer, ASIC, or other programmable data processing apparatus. While a single processor can be used, the present disclosure can be implemented over a plurality of processors.

The "server" described in any of the various examples includes hardware and/or software that provides processing, database, and communication facilities. By way of example, and not limitation, "server" may refer to a single, physical processor with associated communications and data storage and database facilities, or it can refer to a networked or clustered complex of processors and associated network and storage devices, as well as operating software and one or more database systems and applications software that support the services provided by the server.

For the purposes of this disclosure a computer readable medium stores computer data in machine readable form. By way of example, and not limitation, the computer readable medium may include computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium that may be used to store the desired information and which can be accessed by the computer.

The below description references block diagrams and operational illustrations of systems and methods of gasifying municipal solid waste ("MSW") or refuse derived fuel ("RDF") to reduce volume and mass of MSW, while reducing greenhouse gases ("GHG") and other pollutants below levels produced by conventional waste incinerator systems. Gasification involves thermal processing of carbonaceous containing materials or mixtures of materials in an environment having insufficient oxygen to completely combust all of the feed materials and/or all of the by-products produced. A gasification reactor may include a device that indirectly provides heat needed for gasification. A predominant product that exits a gasification reactor is known as water gas, which includes water, hydrogen, carbon dioxide, and carbon monoxide. Other products that exit a gasification reactor include light hydrocarbon gases, un-reacted atmospheric nitrogen and trace contaminants. Producer gas includes a low calorific value due to its nitrogen content and is often improperly referred to as synthesis gas or syngas.

The product that exits an air fed gasification device will be referred to throughout this disclosure as "fuel gas." Fuel gas may contain hydrocarbons; sulfur containing gases such as hydrogen sulfide and other gases; nitrogen containing gaseous species such as ammonia and other gases; halide containing gaseous species such as hydrochloric acid and other gases; and particulates. The particulates are commonly known as fly-ash when exiting the gasifier with gaseous products and bottom ash when exiting the gasifier in a solid or molten stream. If the gasifier is air fed, as opposed to oxygen blown, then a major component of the fuel gas that exits the gasifier will include di-molecular nitrogen. The combustible gas that exits a gasifier will be referred to as fuel gas throughout this disclosure.

It is understood that each block of the block diagrams or operational illustrations, and combinations of blocks in the block diagrams or operational illustrations, can be implemented with analog or digital hardware and computer program instructions. The computer program instructions may be provided to a processor that executes the computer program instructions to implement the functions/acts specified in the block diagrams or operational block or blocks. In some alternative implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

According to one example, the technology described herein includes a multi-stage gasification system that allows independent control of gasification reactions in each of the two gasification reactors of the multi-stage gasification system. For example, gasification reactions that occur in a first gasifier may be controlled separately from gasification reactions that occur in a second gasifier. According to one example, a processor having instructions stored thereon may regulate fluid flow throughout the multi-stage gasification system. According to one example, the processor may be programmed to operate the first and second gasifiers in an oxygen starved or sub-stoichiometric air environment. For example, the processor may be programmed to control dampers that feed oxygen to the first and second gasifiers. Such operation results in the production of a fuel gas, comprised mainly of carbon monoxide, hydrogen, and some methane and other light hydrocarbon gases as combustible components and carbon dioxide, water vapor, and molecular nitrogen as the main non-combustible components. After removal of particulates in high temperature cyclones, this fuel gas is directed to the reformer, burner, and quench units, which provide for staged combustion of the fuel gas. These burner and quench units, in aggregate, are operated with sufficient excess air to complete combustion and minimize pollution.

According to one example, control of the temperature and oxygen partial pressure in the first gasifier and the reformer, and the burner units is accomplished, in part, with the controlled inlet of recycled flue gas. For example, the processor may open, close, or partially open/close a valve within a duct to control a flow of the recycled flue gas to the reformer and burner. According to one example, the processor may monitor the temperature of gases within the first gasifier, the reformer, or the burner and may control valves that supply oxygen and/or recycled flue gas to these components. For example, if the processor measures a temperature within the reformer to be higher than a pre-selected temperature, then the processor may open a valve within a duct to increase a flow of the recycled flue gas to the reformer and/or burner. Alternatively, the processor may open a valve to increase a flow of oxygen into the reformer. According to another example, if the processor measures a temperature within the reformer to be lower than a pre-selected temperature, then the processor may close or partially close a valve within a duct to reduce a flow of the recycled flue gas to the reformer and/or burner. Alternatively, the processor may close a valve to decrease a flow of oxygen into the reformer. Furthermore, if the processor determines that a temperature within a portion of a component such as the reformer is too high or too low, then the processor may adjust valves to direct gas to or divert gas from selected portions of a component.

According to another example, the multi-stage gasification system allows independent control of parameters at various points throughout the multi-stage gasification system. The parameters may be controlled to reduce or avoid formation of hazardous pollutants. According to one example, the parameters may include gas temperature, gas residence time, pressure, flow rate, and oxygen content. According to one example, the parameters may be controlled to adjust for changes in the composition of MSW fed into the multi-stage gasification system. According to one example, the parameters may be controlled to adjust for changes in the composition of MSW fed into a single-stage gasification system.

According to yet another example, the technology may employ a single-stage gasification system instead of a multi-stage gasification system. According to one example, a gasifier in a single-stage gasification system may be operated at a higher temperature with shorter reaction times compared to gasifier in a multi-stage gasification system. According to one example, a rotating kiln may be employed in a single-stage gasification system, without the need for a second gasification stage. According to this example, the rotating kiln may operate at a sufficiently high temperature, with sufficient reaction time, to ensure complete gasification of the waste. For example, MSW may be fed to a rotating kiln, which may produce an inert ash and a fuel gas. According to one example, the fuel gas may be utilized in a same manner as the fuel gas produced by a multi-stage system.

Figure 1:
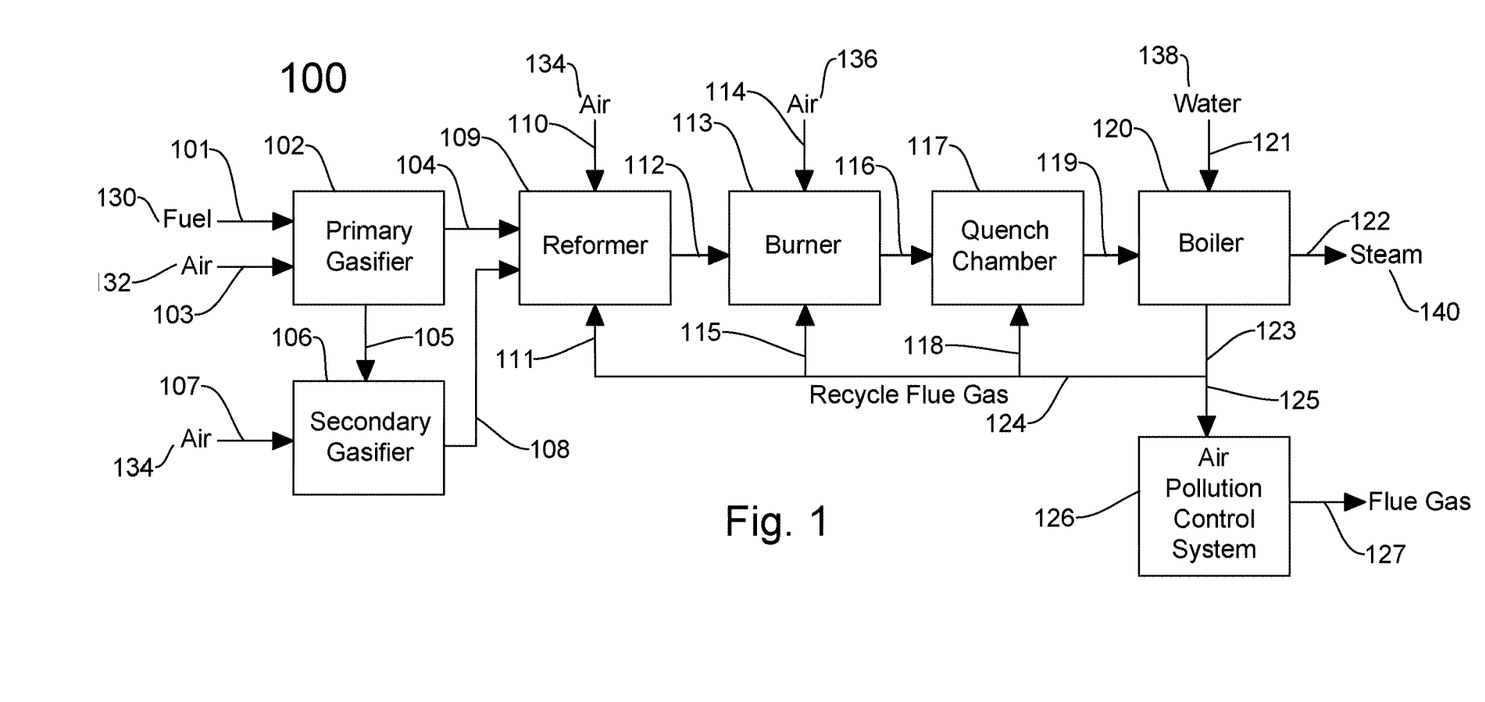
FIG. 1 illustrates a multi-stage gasification system according to one example of the technology.

FIG. 1 illustrates a multi-stage gasification system 100 according to one example of the technology that includes a primary gasifier 102, a secondary gasifier 106, a reformer 109, a burner 113, a quench chamber 117, a boiler 120, and an air pollution control system 126. According to one example, fuel 130 such as refuse derived fuel ("RDF") may be deposited into the primary gasifier 102 via a duct 101. The fuel 130 may include MSW, shredded waste, source separated waste, construction and demolition debris, light combustibles, medical waste and/or biomass, or the like. According to one example, the fuel 130 may be made up of materials that contain carbon, hydrogen, oxygen, nitrogen, sulfur, chlorine, as well as other elements found in the various forms of solid waste. For example, the fuel 130 also may include elements such as phosphorus, silicon and aluminum. The fuel 130 may be blended with an auxiliary fuel or a higher energy content fuel such as tire shreds, oil, or the like, to promote combustion. According to one example, the fuel 130 may be stored in a feeding bin such as an automated feeding bin or the like. According to one example, the fuel 130 may be transported into the primary gasifier 102 via a feeder such as a conveyor belt, cork screw, gravity chute, or the like. According to one example, the feeder may fluidly couple the primary gasifier 102 and the secondary gasifier 106.

According to one example illustrated in FIG. 1, the multi-stage gasification system 100 gasifies the fuel 130 in two stages. One of ordinary skill in the art will readily appreciate that the multi-stage gasification system 100 may employ more than two stages. According to another example, a single-stage gasification system may be used. According to one example, the feeder may transport char and ash from the primary gasifier 102 into the secondary gasifier 106 through a duct 105. The char and ash may include a non-sintered carbonaceous solid containing residue for conversion in the secondary gasifier 106 to a carbonless, sintered ash. According to one example, the secondary gasifier 106 may be configured to receive the fuel 130 directly therein to supplement the char and ash received therein.

According to one example, sub-stoichiometric quantities of air received from air sources 132, 134 may be fed into the primary gasifier 102 and the secondary gasifier 106 via ducts 103, 107, respectively. According to one example, the two stage gasification configuration permits independent control of temperature and gas composition in each of the primary gasifier 102 and the secondary gasifier 106. Independent control of gasifier parameters may allow a reduction in pollutant formation. Alternatively, the independent control of gasifier parameters may eliminate formation of pollutants. According to one example, the two stage gasification configuration may provide complete carbon conversion, which may result in an inert ash product. In other words, the secondary gasifier 106 may complete combustion of unreacted carbon in ash product received from the primary gasifier 102.

With respect to temperature ranges during operation, the primary gasifier 102 may operate in a range of 1000° F. to 1800° F., for example. According to one example, the primary gasifier 102 may operate at a preferred temperature of 1400° F. According to one example, the secondary gasifier 106 may operate in a range of 1900° F. to 2100° F., for example. According to one example, the secondary gasifier 106 may operate at a preferred temperature of 2000° F. One of ordinary skill in the art will readily appreciate that the operating temperature of the secondary gasifier 106 will depend on the melting point of the ash portion of the fuel and whether consolidation (sintering) or slagging is desired. One of ordinary skill in the art will further readily appreciate that the operating temperature of the primary gasifier 102 and the secondary gasifier 106 may fall outside these ranges.

According to one example, the primary gasifier 102 may be a fluid bed gasifier wherein the fuel 130 and/or biomass is placed in an inert bed of fluidized material such as char, sand, or the like. According to one example, the primary gasifier 102 is a rotating kiln. According to one example, the fuel 130 and/or biomass may be fed either above-bed or directly into the bed, depending on a size and density of the fuel 130 and/or biomass. During operation, the bed material may be maintained at a preselected temperature. According to one example, drying, pyrolysis, oxidation, and reduction reactions may occur simultaneously. According to one example, the temperature at the top of the gasifier may be 100° F.-150° F. lower than the temperature at the bottom of the gasifier.

According to one example, the multi-stage gasification system 100 may include a reformer 109 that is fluidly coupled to the primary gasifier 102 via a duct 104 and is fluidly coupled to the secondary gasifier 106 via a duct 108. According to one example, the reformer 109 receives primary fuel gas that is generated in the primary gasifier 102 through duct 104 and secondary fuel gas that is generated in the secondary gasifier 106 through duct 108. According to one example, the reformer 109 may be fluidly coupled to an air source 134 through duct 110 and may be fluidly coupled to recycled flue gas exiting the heat recovery system 120, typically a boiler or flue gas heat exchanger, via duct 111. According to one example, the reformer 109 may receive air from air source 134 through duct 110 and a portion of the recycled flue gas from the boiler 120 through duct 111. According to one example, the reformer 109 thermally cracks and reforms volatilized hydrocarbons that are generated in the primary gasifier 102 and the secondary gasifier 106 to form predominantly water gas species. According to one example, the water gas species may include hydrogen, water, carbon monoxide, and carbon dioxide, along with minor quantities of light hydrocarbon gases and readily combustible soot carbon particles.

According to one example, the reformer 109 may provide a reducing gas atmosphere that substantially thermally decomposes any ammonia that was predominantly formed in the primary gasifier 102. According to one example, the reformer 109 may substantially thermally decompose the ammonia into nitrogen and hydrogen. For example, the processor may regulate and control the composition and flow rate of gases through the multi-stage gasification system 100 in order to maintain a temperature within the reformer 109 in a range that thermally decomposes the ammonia into nitrogen and hydrogen. According to one example, the reformer 109 may convert the ammonia produced from organic nitrogen provided in the fuel 130 to minimize production of fuel NOx. Accordingly, the multi-stage gasification system 100 substantially eliminates a precursor to fuel NOx formation. According to one example, any inert gases such as nitrogen and argon provided within the reformer 109 may remain virtually unreacted.

According to one example, the multi-stage gasification system 100 may include a processor with instructions stored thereon that regulate fluid flow throughout the multi-stage gasification system 100. According to one example, the processor may be electrically coupled to one or more gas regulators that control opening and closing of internal dampers or valves in order to direct fluid flow through ducts within the multi-stage gasification system 100. For example, the processor may be programmed to set the internal valves within the ducts to fully open, fully closed, partially open, or partially closed. The gas regulators may be fluidly coupled to gas sources that provide gases to the multi-stage gasification system 100 such as air, oxygen, carbon dioxide, carbon monoxide, nitrogen, and hydrogen, among other gases. The multi-stage gasification system 100 may further include sensors that are electrically coupled to the processor. The sensors may be configured to measure values such as temperature, fluid flow, gas concentration, and energy content, among other values. According to one example, the processor may electrically communicate with gas regulators, gas sources, blowers, and sensors, among other devices, to establish and maintain desired operating conditions within the multi-stage gasification system 100. For example, the processor may control dampers located within the ducts to determine a quantity of flue gas that is recirculated to the various components of the multi-stage gasification system 100.

Furthermore, the processor may control one or more gas regulators to meter a quantity of gas such as oxygen that is provided through the ducts to the various components of the multi-stage gasification system 100. The processor also may control a motor that drives a feeder supplying the fuel 130 into the first and/or second gasifiers 102, 106. For example, the processor may control the speed of feeder. According to one example, the multi-stage gasification system 100 may include a plurality of feeders that separately feed fuel 130 components such as the MSW, the shredded waste, the source separated waste, the construction and demolition debris, the light combustibles, and/or the biomass, or the like, into the first and/or second gasifiers 102, 106. The processor may control one or more motors that drive multiple feeders to provide a desired blend of fuel 130.

According to one example, the processor may regulate oxygen flow rates within the multi-stage gasification system 100 to maintain the oxygen partial pressure in the reformer 109 at sub-stoichiometric levels. For example, the amount of oxygen fed into the reformer 109 may result in oxygen utilization of only 90-95% compared to an amount needed for complete combustion. According to one example, an optimal ratio of fuel gas, air, and recycled flue gas within the reformer 109 will depend on multiple factors including the composition of the fuel gases received from the primary and secondary gasifiers 102, 106; a fluid flow rate within the ducts 104, 108; an amount of excess oxygen received in the recycled flue gas through duct 111; and the temperatures of each stream, among other factors. According to one example, a temperature of the gases provided to the reformer 109 is greatly increased. With respect to a temperature range during operation, the reformer 109 may operate in a range of 1900° F. to 2500° F. or higher, for example. One of ordinary skill in the art will readily appreciate that the operating temperature of the reformer 109 may fall outside these ranges. According to one example, the operating temperature may be controlled by a ratio of ambient air provided via air source 134 and recycled flue gas provided via duct 111.

According to one example, the content of the fuel 130 and/or the biomass may change over time since waste composition varies over time. For example, the presence of paper products in the MSW may increase chlorine content, while the presence of carpet in the MSW may increase nitrogen content. According to one example, the processor may monitor sensors throughout the multi-stage gasification system 100 and may adjust system components such as dampers located within the ducts to maintain desired system parameters such as temperature, fluid flow, and gas concentrations, or the like, in order to maintain equilibrium conditions. For example, dampers may be adjusted to adjust a flow of recycled flue gas into the various system components to control operating temperatures. In this way, the processor is capable of adjusting the multi-stage gasification system 100 to process fuel 130 and/or the biomass having any of a variety of compositions, including those typical of light construction and demolition waste, source separated commercial waste, residential municipal solid waste and agricultural biomass. The processor will control each stage's temperature and find the temperatures and recycled flue gas flow to each branch to minimize the NOx formed for each fuel type.

According to one example, the reformer 109 is maintained at a high temperature to facilitate decomposition of ammonia in the fuel gas. According to one example, the reformer 109 may operate in a range of 1900° F. to 2500° F., for example. According to one example, the high temperature provided in the reformer 109 increases the decomposition rate of ammonia into diatomic nitrogen and hydrogen by making the ammonia less thermodynamically favorable. Furthermore, the high temperature provided in the reformer 109 facilitates a steam reforming reaction in which water vapor reacts with hydrocarbons in the fuel gas to produce hydrogen and carbon monoxide. According to one example, the reformer 109 may be sized to provide a predetermined amount of residence time for the fuel gas to be reformed. According to one example, the reformer 109 may be sized to provide at least two seconds of residence time for the fuel gas to be reformed. One of ordinary skill in the art will readily appreciate that the amount of residence time may vary depending on the temperature maintained in the reformer 109 and the gas flow rate.

According to one example, the reformer 109 does not utilize a catalyst. This provides the multi-stage gasification system 100 with advantages over conventional gasification systems that utilize a catalyst. For example, operating the reformer 109 without a catalyst reduces the pressure drop across the reformer 109 and reduces operational costs.

Advantages of the multi-stage gasification system 100 over conventional gasification systems may be demonstrated through computation of the equilibrium composition of the gases as a function of the gas temperature in the reformer 109. An assumption may be made that all of the organic nitrogen in the fuel is converted to ammonia in the reducing atmosphere of the primary gasifier 102. According to one example, the primary gasifier 102 may be operated at a temperature between approximately 1,200° F. and 1700° F. At these temperatures, thermal decomposition is relatively small for the typical range of nitrogen, hydrogen, and ammonia compositions produced by gasification of waste types described herein.

With respect to computing reaction equilibrium, data for published equilibrium constant Kp by Brown et. al. may be used for the Haber process in which ammonia is formed by the reaction of nitrogen and hydrogen. The extent to which the reverse reaction occurs may be estimated.

A chemical equation for the formation of ammonia from its elements is:

$$N_2 + 3H_2 \rightarrow 2NH_3$$

An equilibrium concentration of ammonia in the reformed fuel gas may be estimated using the following equation:

$$C_{NH3} = \sqrt{K_P (RT)^{\Delta n} C_{N2} C_{H2}^3}$$

where $C_{NH3}$, $C_{N2}$, and $C_{H2}$ are molar concentrations of ammonia, nitrogen, and hydrogen gases in moles per liter. The ammonia molar concentration is typically small compared to the nitrogen and hydrogen molar concentrations. According to one example, any ammonia remaining in the exhaust gases of the reformer 109 may be estimated from the air and the recycle gas utilization, the hydrogen from the carbon, hydrogen, and oxygen atom balances, and the water gas shift equilibrium, assuming the residual hydrocarbon gases are negligible compared to the water gas species.

Alternatively, an approximation of an improved performance of the multi-stage gasification system 100, as compared to conventional gasification systems, may be made by comparing results of operating the reformer 109 at a higher temperature than the primary gasifier 102. According to one example, the approximation is determined by computing a percent reduction in ammonia concentration from a base case of a value at 700° C. (1,292° F.), which is effectively proportional to the square root of the ratio of the equilibrium constants at 700° C. divided by the value at the higher temperature. The results are presented in Table 1 below.

TABLE 1

Estimation of The % Reduction in NOx Relative to 700° C.

| T° C. | KP | % Reduction in NOx Relative to 700° C. |
|---|---|---|
| 700 | 5.096 × 10$^{-07}$ | 00.0% |
| 800 | 1.522 × 10$^{-07}$ | 45.3% |
| 900 | 5.586 × 10$^{-08}$ | 66.9% |
| 1000 | 2.400 × 10$^{-08}$ | 78.3% |
| 1100 | 1.166 × 10$^{-08}$ | 84.9% |
| 1200 | 6.249 × 10$^{-09}$ | 88.9% |
| 1300 | 3.625 × 10$^{-09}$ | 91.6% |

According to one example, a majority of the chemical energy or higher heating value is converted to sensible heat and partial combustion products in the reformer 109 in order to mitigate against having a high energy density localized fuel gas to burn in the burner 113. The sensible heat corresponds to changes in temperature of the gas without a change in phase. In this way, the reformer 109 operates to minimize prompt NOx formation. According to one example, adverse consequences such as formation of thermal NOx that may result from introducing higher than normal higher fuel gas feed temperature into the burner 113 may be mitigated by burning and cooling the low energy content reformed fuel gas with a blend of warm recycle fuel gas and ambient air. Accordingly, the reformer 109 may be configured to limit total NOx formation in the multi-stage gasification system 100.

According to one example, the reformer product fuel gas that is generated in the reformer 109 may be delivered into the fuel gas burner 113 through a duct 112. The fuel gas burner 113 also may receive air from an air source 136 through a duct 114 and may further receive a portion of the recycled flue gas that originates from the boiler 120 through a duct 115. According to one example, the fuel gas burner 113 may be dimensioned to provide the reformer product fuel gas with sufficient gas residence time at a sufficient temperature to completely combust all carbonaceous and hydro-carbonaceous materials.

According to one example, the fuel gas burner 113 may be controlled to limit the oxygen content and the temperature therein so as to minimize NOx formation. For example, the fuel gas burner 113 may be controlled to adjust the temperature to approximately under 1800° F. by adjusting the ratio of ambient air and recycled flue gas. According to one example, the temperature in the fuel gas burner 113 may be selected to limit thermal NOx formation to insignificant levels, while providing sufficient heat in the fuel gas burner 113 to quickly destroy dioxins, furans, and any remaining carbonaceous and hydro-carbonaceous material. One of ordinary skill in the art will readily appreciate that an optimal ratio of reformed fuel gas from the reformer 109, air from the air source 136, and the recycled flue gas originating from the boiler 120 will depend on multiple factors including a composition of the reformed fuel gas, an amount of excess oxygen in the recycled flue gas, and the temperature of each stream, among other factors. One of ordinary skill in the art will readily appreciate that the fuel gas burner 113 may be maintained at any desired temperature, below the adiabatic flame temperature of the fuel gas. According to one example, the fuel gas burner 113 may control combustion of the reformed fuel gases to minimize production of thermal NOx.

According to one example, the burner product flue gas that originates from the fuel gas burner 113 may be introduced into the quench chamber 117 through a duct 116. The quench chamber 117 also may receive a portion of the recycled flue gas that originates from the boiler 120 through a duct 118. According to one example, the quench chamber 117 may be dimensioned to provide the burner product fuel gas with sufficient gas residence time to cool by mixing with the portion of the recycled flue gas received through the duct 118. According to one example, the burner product flue gas may be cooled prior to delivery into a heat recovery system 120 in order to solidify any molten mineral matter entrained in the resulting quench flue gas. The quench flue gas, with any molten mineral matter solidified, may be transported to the heat recovery system 120 via a duct 119. According to one example, the molten mineral matter may be solidified to avoid fouling the heat recovery system tubes or other parts such as by having mineral matter stick thereto. The quench chamber 117 is further configured to avoid acid gas attack on the heat recovery system tubes. In this way, the quench chamber 117 is designed to maintain clean system parts in order to extend the useful life of the system, including the heat recovery system 120.

According to one example, a target cooling temperature for the quench flue gas may be determined by heat recovery system specifications. For example, the quench flue gas may be cooled to approximately 1400° F. based on heat recovery system specifications. One of ordinary skill in the art will readily appreciate that other target cooling temperatures may be selected based on boiler specifications. There are advantages to quenching the burner product flue gas with the recycled flue gas rather than quenching with air. For example, the recycled flue gas maintains an overall excess oxygen at a desired level in the flue gas stream. According to one example, controlling excess oxygen in the exhaust may improve performance of the air pollution control system 126 by reducing the dilution of pollutants. Furthermore, using recycled flue gas allows a reduction in total volume of flue gas that passes through a downstream air pollution control system 126. According to one example, using the recycled flue gas reduces a flow rate through the air pollution control system 126, which allows for reductions in equipment size, heat loss, and capital costs. Additionally, recycled flue gas includes a higher moisture content as compared to ambient air. According to one example, a higher moisture content allows for more efficient operation of the electrostatic precipitator of the air pollution control system 126. Still further, using recycled flue gas provides better overall plant efficiency by lessening a flow of hot gas out of the stack.

According to one example, suitably treated boiler feed water 138 may be pumped into the heat recovery boiler 120 via pipe 121. According to one example, the heat recovery system 120 may include a heat energy recovery system such as a heat exchanger that transfers a portion of sensible heat from the quench flue gas 119 to the boiler feed water 138. The heat recovery system 120 generates product steam 140 that is delivered to a generator via pipe 122 in order to produce electrical power. Alternatively, the heat recovery system 120 may include a heat recirculating thermal oil that drives an organic Rankine cycle system that generates electrical power. In an organic Rankine cycle, instead of using steam as the working fluid, a refrigerant is used in a closed loop in which the refrigerant is heated by a heat transfer fluid that extracts the sensible heat from the hot flue gases. The refrigerant expands as it is heated and drives a turbine whose shaft rotates and produces power in a generator. According to one example, the heat recovery system 120 may operate with an exhaust in a range of 600° F. to 800° F., for example. According to one example, the heat recovery system 120 may operate at a preferred exhaust temperature of 700° F. when optimizing subsequent SCR treatment for NOx emissions reduction.

According to one example, a high proportion of the heat recovery system exhaust flue gas may be diverted from the heat recovery system 120 via a duct 123 and may be distributed as recycled flue gas through ducts 111, 115, 118, 124, and 125. While a conventional system may recycle 20-40% of the heat recovery system flue gas, the multi-stage gasification system 100 described herein may recycle 60-75% of the heat recovery system's exhaust flue gas. An optimal percentage of heat recovery system recycled flue gas will depend on a desired amount of excess oxygen contained in the boiler flue gas. According to one example, less recycle boiler flue gas is needed with a higher concentration of excess oxygen in the flue gas. According to one example, any boiler flue gas that is not recirculated to the quench chamber 117, the burner 113, and/or the reformer 109 may be diverted to the air pollution control system 126 via duct 125 for cleaning. According to one example, the cleaned heat recovery system's exhaust flue gas may be vented to the atmosphere via a stack 127.

Air pollution control systems are typically employed for post formation control of most combustion products from MSW combustion systems such as NOx emissions, particulates, acids, heavy metals, volatile organic compounds, or the like. For example, electrostatic precipitators as well as fabric filters/bag-houses may be effective for removing particulates. Dry scrubbing is commonly used to remove sulfur oxides and hydrogen halides. Injection of activated carbon upstream of the particulate collection devices is effective for removal of heavy metals and volatile organic compounds. Selective catalytic reduction (SCR) units are typically employed to meet emissions standards. However, these devices are expensive and provide a large footprint for MSW combustion systems.

According to one example, the multi-stage gasification system 100 is operated to maintain equilibrium conditions such that any pollutants are emitted at or below air emissions standards for MSW combustion systems. Accordingly, the air pollution control system 126 of the present technology may require few post formation control devices. However, given the dynamic and ever changing composition of the MSW that is processed by the multi-stage gasification system 100, the air pollution control system 126 may include devices that ensure compliance with air emissions standards such as a selective catalytic reduction (SCR) unit, an electrostatic precipitator (ESP), an acid-gas removal unit, a bag house or other flue gas clean-up units. Depending on the air quality standards of an area, the NOx concentration within the boiler flue gas may be sufficiently low as to not require catalytic reduction of the NOx. Avoiding use of post formation control devices such as catalytic reduction will save significant construction cost for the air pollution control system 126.

Figure 4:
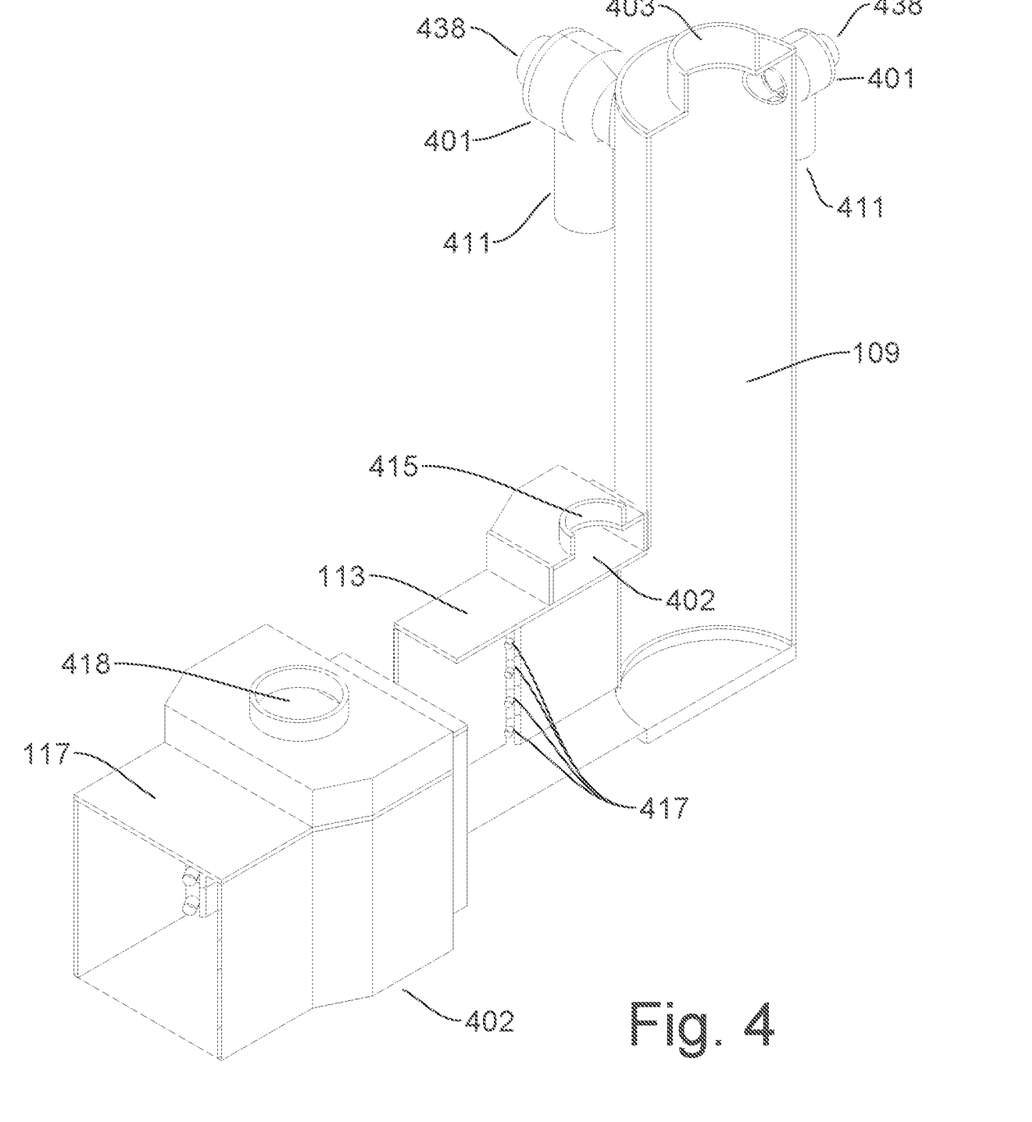
FIG. 4 illustrates a cross-sectional view of a reformer-burner-quench unit for reforming, combusting, and quenching the fuel gas produced by the gasifiers according to one example of the technology.

FIG. 4 illustrates a portion of the multi-stage gasification system 100 including the fuel gas reformer 109, the fuel gas burner 113, and the flue gas quench chamber 117 according to one example of the technology. According to one example, the fuel gas reformer 109 may be a vertically oriented cylindrical tube having multiple gasifiers that are fluidly coupled thereto. According to one example, fuel gas from the multiple gasifiers may enter the reformer 109 through ducts 438 provided near the top of the reformer 109. This reformer configuration may be advantageous when used with updraft gasifiers having high fuel gas outlets. According to one example, annular headers 401 may be provided near the top of the reformer 109 to mix the fuel gas with a mixture air and the recycled flue gas during entry into the vertically oriented cylindrical tube. According to one example, the air and the recycled flue gas mixture may be supplied to the reformer 109 through ducts 411. The top of the reformer 109 may include a short vent stack 403 that serves as an emergency bypass. According to one example, the short vent stack 403 may vent any lighter-than-air fuel gas that may accumulate in the reformer 109 during shut down.

According to one example, the reformer 109 may include annular headers 401 with outlets that are offset from a central axis of the vertically oriented cylindrical tube. According to one example, the outlets may be positioned to promote a cyclonic gas flow through the reformer 109 in order to promote mixing of the gases. According to one example, the outlets may be oriented to reduce local temperature differences and promote a complete reaction, which are important to minimize formation of prompt NOx. According to one example, the multi-stage gasification system 100 may include fans, ducts, pipes, dampers, and/or baffles to fluidly couple the quench chamber 117, the burner 113, and the reformer 109, along with other components.

According to one example, the reformer fuel gas is directed from the reformer 109 into the fuel gas burner 113 through a duct. According to one example, the burner 113 may include a rectangular-shaped duct. Alternatively, the burner 113 may include a cylindrical-shaped duct. One of ordinary skill in the art will readily appreciate that other duct shapes may be employed. According to one example, a duct 415 may be provided in fluid communication with a plenum 402 in order to equally distribute a mixture of air and recycled flue gas in the burner 113. According to one example, the plenum 402 may be shaped to evenly distribute the mixture of air and recycled flue gas through a series of nozzles 417. For example, the plenum 402 may be formed in a U-shape. According to one example, the nozzles 417 may be oriented to promote even mixing of the reformer fuel gas with the air and recycled flue gas mixture.

According to one example, the quench chamber 117 may be positioned after the burner 113. According to one example, the quench chamber 117 may be dimensioned to allow a predetermined residence time in order to destroy any tars remaining in the burner fuel gas. According to one example, a configuration of the quench chamber 117 may be similar to the configuration of the burner 113. According to one example, a duct 418 may be provided at the quench chamber 117 to receive recycled flue gas. For example, the duct 418 may be provided at a top portion of the quench chamber 117 to receive recycled flue gas.

Figure 2:
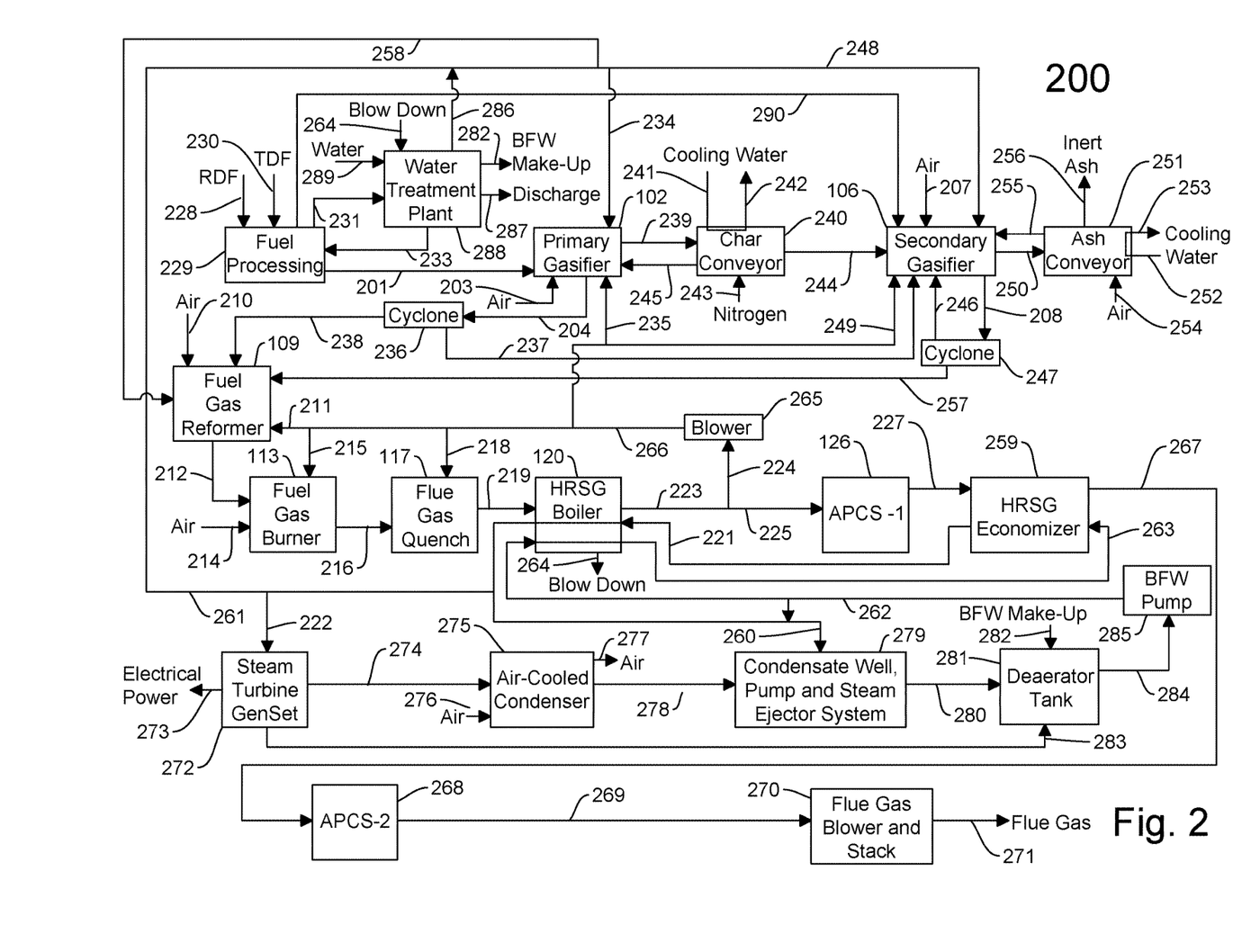
FIG. 2 illustrates a multi-stage gasification system for converting solid waste and/or biomass into power by waste gasification in a shallow fluid bed and a residue kiln gasifier with staged reforming and combustion of the fuel gas produced with low levels of NO, gaseous emissions.

FIG. 2 illustrates a multi-stage gasification system 200 according to one example of the technology that includes a primary gasifier 102, a secondary gasifier 106, a reformer 109, a burner 113, a quench chamber 117, a boiler 120, and an air pollution control system 126, among other components. According to one example, the multi-stage gasification system 200 is a waste-to-energy conversion system that efficiently converts solid waste and/or biomass into steam that is used to generate power. According to one example, the multi-stage gasification system 200 is designed to minimize NOx emissions through staged fuel gas combustion and flue gas recycle. According to one example, refuse derived fuel ("RDF") may be prepared from MSW, source separated waste, and/or construction and demolition debris light combustibles, or the like. The RDF may be deposited into a fuel processing building 229 via a duct or chute 228. According to one example, the RDF may be blended with an auxiliary or higher energy content fuel such as tire shreds ("TDF") or the like. The TDF may be deposited into a fuel processing building 229 via a duct or chute 230. The resulting fuel mixture is typically stored in an automated feeding bin that is contained within the facility fuel processing building 229.

According to one example, any water that is expelled from the fuel processing building 229 may be collected and routed through a pipe 231 to a water treatment plant 288 for purification, re-use, and/or disposal. For example, any water expelled during handling and shredding of the waste, as well as any waste water generated from the building by personnel sanitary functions, may be collected and routed through the pipe 231 to the water treatment plant 288 for purification, re-use, and/or disposal. According to one example, any water needed at that the fuel processing building 229, including for sanitary functions, may be provided through a pipe 233 from the water treatment plant 288.

According to one example, a fuel mix obtained through a duct 201 from the fuel processing building 229 may be transported into the primary gasifier 102 by a feeder such as an augured conveying and metering device, a conveyor belt, cork screw, gravity chute, or the like. According to one example, an air source may provide a sub-stoichiometric quantity of oxygen to the primary gasifier 102 through a duct 203. For example, the air source may feed air or an oxygen rich gas into the primary gasifier 102 via a gas distribution grid. According to one example, the gas distribution grid may distribute the air or oxygen rich gas uniformly or in a preferential pattern into and over a base of the inventory provided in the primary gasifier 102. According to one example, steam may be injected into the primary gasifier 102 through a duct 234. Furthermore, recycle fuel gas may be injected into the primary gasifier 102 through a duct 235. According to one example, the steam and recycle fuel gas may be regulated to control conditions within the primary gasifier 102.

According to one example, primary gasifier fuel gas may be extracted from the primary gasifier 102 through a duct 204. According to one example, the duct 204 may carry the primary gasifier fuel gas into a primary gasifier cyclone 236. According to one example, any particulates removed from the primary gasifier fuel gas may exit down a dipleg and may be conveyed to the secondary gasifier 106 through a duct 237. According to one example, the fuel gas that exits the primary gasifier cyclone 236 is transported to the fuel gas reformer 109 through a duct 238.

According to one example, primary gasifier residue solids exit the primary gasifier 102 through a duct 239 and are transported to a char conveyor 240 before delivery to the secondary gasifier 106. According to one example, the char conveyor 240 is jacketed with cooling water fed by pipes 241, 242. According to one example, blanket nitrogen is fed into the char conveyor 240 through a duct 243. According to one example, a portion of the injected nitrogen exits the char conveyor 240 with the cooled char ash primary gasifier residue via a duct 244. According to one example, a balance of the blanket nitrogen may be drawn into the primary gasifier 102 through a duct 245. According to one example, the cooled char ash primary gasifier residue, along with a portion of the blanket nitrogen, may be conveyed via an auger into the secondary gasifier 106. The secondary gasifier 106 also may receive the fly ash from the primary gasifier cyclone 236 through a duct 237 and the fly ash from the secondary gasifier cyclone 247 through a duct 246 via the auger.

According to one example, the secondary gasifier 106 may receive a sub-stoichiometric quantity of oxygen via a duct 207 from an air source having air or an oxygen rich gas. According to one example, the secondary gasifier 106 may include a gas sparger that distributes the air or oxygen rich gas uniformly or in a preferential pattern into and over the solids inventory. According to one example, the secondary gasifier 106 may be a rotating kiln. According to one example, steam may be injected into the secondary gasifier 106 through a duct 248. Furthermore, recycle fuel gas may be injected into the secondary gasifier 106 through a duct 249. According to one example, the steam and recycle fuel gas may be regulated to control conditions within the secondary gasifier 106. According to one example, processed fuel may be fed directly into the secondary gasifier 106 through duct 290 in order to increase an overall capacity of the multi-stage gasification system 200. Furthermore, processed fuel may be fed directly into the secondary gasifier 106 through duct 290 for waste requiring high temperature thermal treatment.

According to one example, secondary gasifier ash residue solids are removed from the secondary gasifier 106 through a duct 250. The secondary gasifier ash residue solids may be and transported through an ash conveyor 251 that is jacketed with cooling water or glycol fed by pipes 252, 253. Additionally, or in the alternative, the ash conveyor 251 may be cooled by a countercurrent air flow generated by an air source through a duct 254. Heated air from the ash conveyor 251 may be directed into the secondary gasifier 106 via a duct 255. According to one example, cooled inert ash may be removed from the ash conveyor 251 through a duct 256.

According to one example, the residual ash material may be a non-leachable, carbon-free, inert ash product such as a carbon free sintered mineral ash that does not require special storage or disposal. According to one example, the cooled inert ash may be a residual ash material that is carbon free and may be used for aggregate or architectural fill. For example, the residual mineral material may be used as an aggregate material in cementitious products. Alternatively, the cooled inert ash may be safely disposed in a landfill. In this way, the residual mineral material is a value added product rather than an environmental liability such as ash product produced from conventional thermal treatment plants.

According to one example, secondary gasifier fuel gas may be extracted from the secondary gasifier 106 through a duct 208. According to one example, the duct 208 may carry the secondary gasifier fuel gas into a secondary gasifier cyclone 247. According to one example, any particulates removed from the secondary gasifier fuel gas may exit down a dipleg and may be conveyed to the secondary gasifier 106 through a duct 246. For example, the particulates may be augered back into the secondary gasifier 106. According to one example, the fuel gas that exits the secondary gasifier cyclone 247 is transported to the fuel gas reformer 109 through a duct 257.

According to one example, the fuel gases that exit the primary and secondary gasifier cyclones 236, 247 are transported to the fuel gas reformer 109 via ducts 238, 257. According to one example, an air source 210 provides a sub-stoichiometric quantity of oxygen to the fuel gas reformer 109. Additionally, a blower 265 provides the recycled flue gas from the heat recovery system 120 to the fuel gas reformer 109 through a duct 211. The oxygen and recycled flue gas may provide the fuel gas reformer 109 with aspiration of the fuel gas streams. According to one example, steam injected through duct 258 may be regulated to control conditions within the fuel gas reformer 109. For example, the steam may be injected to control an exhaust temperature of the fuel gas reformer 109. According to one example, recycled flue gas provides the steam and carbon dioxide injected to control conditions within the fuel gas reformer 109.

According to one example, exhaust fuel gases may be extracted from the fuel gas reformer 109 through a duct 212. According to one example, the duct 212 may carry the exhaust fuel gases into the fuel gas burner 113 for burning with excess air obtained from an air source via a duct 214 and with recycled flue gas obtained from a duct 215. The resulting flue gases may be transported to the flue gas quench 117 via a duct 216. According to one example, recycled flue gas may be introduced into the flue gas quench 117 via a duct 218 in order to cool the resulting flue gases received from duct 216 to below a melting point of molten salts that are included with the entrained particulates in the resulting flue gases.

According to one example, quench fuel gases may be extracted from the flue gas quench 117 into the heat recovery steam generator (HRSG) boiler 120 via a duct 219. The quench fuel gases transfer a portion of their sensible heat to the pre-heated boiler feed water via pipe 221 that passes through the HRSG economizer 259. According to one example, the HRSG boiler 120 generates steam that is fluidly coupled with a steam turbine generator set 272 via pipe 222, a condensate well, pump and steam ejector system 279 via pipe 260, and the primary and secondary gasifiers 102, 106 via pipe 261. The HRSG boiler 120 also preheats the feed water received by the HRSG/economizer 259 through a pipe 263 to an inlet stream temperature specification. According to one example, the boiler feed water blow down may be discharged via pipe 264.

According to one example, a portion of the total flue gas that exits the HRSG boiler 120 via duct 223 may be diverted to the recycled flue gas blower 265 via duct 224. The output recycled flue gas blower 265 may be divided into the various streams via duct 266. For example, the various streams may feed the fuel gas reformer 109 via the duct 211, the fuel gas burner 113 via the duct 215, the flue gas quench 117 via the duct 218, the primary gasifier 102 via the duct 235, and the secondary gasifier 106 via the duct 249.

According to one example, a remaining portion of the total flue gas that exits the HRSG boiler 120 via duct 223 may be directed to the Air Pollution Control Systems #1 ("APCS #1") 126 via duct 225. In the APCS #1 126, dry sorbent may be injected to remove acid gas, electrostatic precipitation may be performed to remove particulates, selective catalytic reaction may be performed to reduce carbon monoxide, and/or selective catalytic reduction may be performed to remove NOx in order to clean the flue gases.

According to one example, the exhaust gases from the APCS #1 126 are drafted through the HRSG economizer 259 via a duct 227. The cooled flue gas from the HRSG economizer 259 is then drafted through the Air Pollution Control Systems #2 ("APCS #2") 268 via a duct 267. According to one example, the APCS #2 includes activated carbon and performs a dry acid gas treatment or sorbent injection prior to entry into a fabric filter-bag house for final particulate removal. According to one example, the cooled and cleaned flue gas may be drafted into the flue gas blower and stack 270 via a duct 269. The flue gas blower and stack 270 may include a blower that discharges the exhaust via a duct 271 to the atmosphere through an exhaust stack.

According to one example, a duct 222 delivers superheated steam from the HRSG boiler 120 into the steam turbine generator set 272. The superheated steam is expanded in the steam turbine generator set 272, which generates electric power that is transported by wires 273. According to one example, the expanded exhaust steam is directed to an air-cooled condenser 275 via duct 274. The expanded exhaust steam is condensed with ambient air provided by an air source through duct 276. According to one example, the ambient air may be drafted by fans across condenser tubes provided in the air-cooled condenser 275. The ambient air may exit the air-cooled condenser 275 as heated air via a duct 277.

According to one example, condensed steam is ejected from the air-cooled condenser 275 via a pipe 278 and delivered to the condensate well, pump and steam ejector system 279, along with ejector steam through a duct 260. The condensate 280 from the condensate well, pump and steam ejector system 279 is pumped into the deaerator tank 281 via pipe 280. According to one example, deaeration is performed through introduction of boiler feed water (BFW) make-up via pipe 282 and introduction of steam via duct 283. According to one example, deaerated BFW is pumped from the deaerator tank 281 through pipe 284 via a BFW Pump 285. According to one example, a small portion of the deaerated BFW is utilized to de-superheat the ejector and gland seal steam via a pipe 260. The remainder of the discharge from the BFW Pump 285 is sent to the BFW preheater section of the HRSG boiler 120 via pipe 262.

According to one example, the water treatment plant 288 supplies the sanitary water to the fuel processing facility via pipe 233, the BFW make-up to the deaerator tank 281 via pipe 282, the effluent discharge via pipe 287, and the water provided through pipe 286 that is used to de-superheat steam used for the primary gasifier 102, the secondary gasifier 106, and the gas reformer 109, among other components. According to one example, the water treatment plant 288 generates the water from the leachate/wastewater received via pipe 231 from the facility's fuel processing building 229, from the HRSG blow down received via pipe 264 from the HRSG boiler 120, and the make-up water introduced through pipe 289 to maintain a water balance at the water treatment plant 288.

Figure 3:
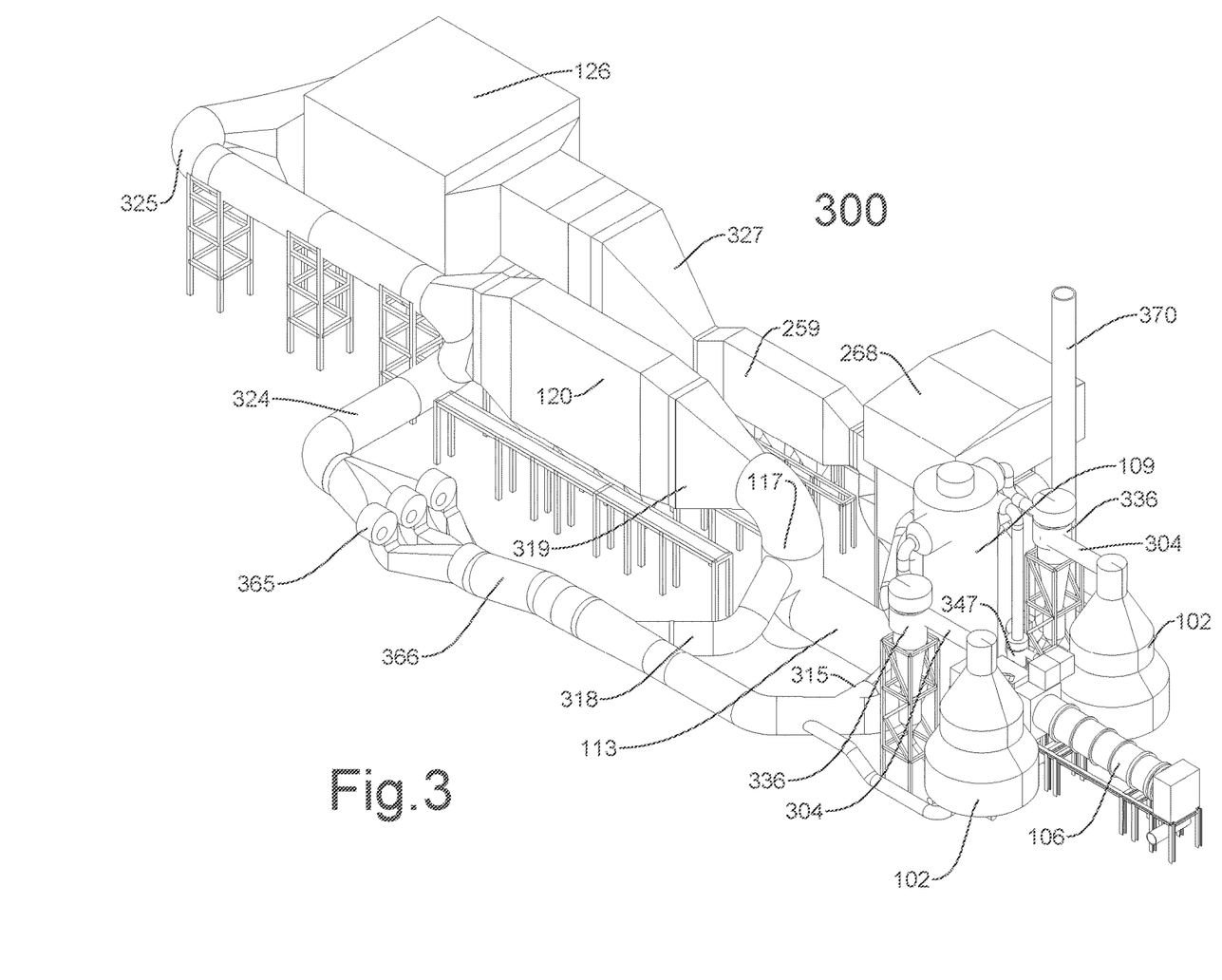
FIG. 3 illustrates an isometric view of a multi-stage gasification system including an updraft gasifier for a primary thermal reactor and a rotary kiln as a secondary thermal reactor according to one example of the technology.

FIG. 3 illustrates an isometric representation of portions of the multi-stage gasification system illustrated in FIG. 2. According to one example, the multi-stage gasification system 300 includes a primary gasifier 102, a secondary gasifier 106, a reformer 109, a burner 113, a quench chamber 117, a boiler 120, and an air pollution control system 126, among other components. According to one example, the multi-stage gasification system 300 is a waste-to-energy conversion system that efficiently converts solid waste and/or biomass into steam that is used to generate power. According to one example, the multi-stage gasification system 300 is designed to minimize NOx emissions through staged fuel gas combustion and flue gas recycle. FIG. 3 illustrates one of several arrangements for these components. Some components, such as ducts, pipes, dampers, baffles, and structural supports are omitted so as not to obscure the relevant features being illustrated and described.

According to one example, a fuel mix obtained from a fuel processing building is transported into the primary gasifiers 102,102 by a feeder such as an augured conveying and metering device, a conveyor belt, gravity chute, or the like. According to one example, primary gasifier fuel gas may be extracted from the primary gasifiers 102,102 through ducts 304,304. According to one example, the ducts 304 may carry the primary gasifier fuel gas into corresponding primary gasifier cyclone 336,336. According to one example, any particulates removed from the primary gasifier fuel gas may exit down a dipleg and may be conveyed to the secondary gasifier 106 through a duct.

According to one example, the fuel gas that exits the primary gasifier cyclones 336,336 may be transported to the fuel gas reformer 109 through a duct. According to one example, primary gasifier residue solids that exit the primary gasifiers 102,102 through a duct may be transported to a char conveyor before delivery to the secondary gasifier 106. The secondary gasifier 106 also may receive the fly ash from the primary gasifier cyclones 336,336 through a duct and the fly ash from the secondary gasifier cyclone 347 through a duct. According to one example, the secondary gasifier 106 may receive a sub-stoichiometric quantity of oxygen via a duct from an air source having air or an oxygen rich gas. Furthermore, processed fuel may be fed directly into the secondary gasifier 106 for waste requiring high temperature thermal treatment and/or to increase an overall capacity of the multi-stage gasification system 300.

According to one example, secondary gasifier ash residue solids are removed from the secondary gasifier 106 through a conveyor. According to one example, secondary gasifier fuel gas may be extracted from the secondary gasifier 106 through a duct that carries the secondary gasifier fuel gas into a secondary gasifier cyclone 347. According to one example, any particulates removed from the secondary gasifier fuel gas may exit down a dipleg and may be conveyed to the secondary gasifier 106 through a duct. For example, the particulates may be augered back into the secondary gasifier 106. According to one example, the fuel gas that exits the secondary gasifier cyclone 347 is transported to the fuel gas reformer 109 through a duct.

According to one example, the fuel gases that exit the primary and secondary gasifier cyclones 336, 347 are transported to the fuel gas reformer 109 via ducts. According to one example, an air source provides a sub-stoichiometric quantity of oxygen to the fuel gas reformer 109. According to one example, a blower 365 provides the recycled flue gas from the boiler 120 to the fuel gas reformer 109 to cool gases therein. The oxygen and recycled flue gas provide the fuel gas reformer 109 with aspiration of the fuel gas streams. According to one example, steam injected through duct may be regulated to control conditions within the fuel gas reformer 109. For example, the steam may be injected to control an exhaust temperature of the fuel gas reformer 109.

According to one example, exhaust fuel gases may be extracted from the fuel gas reformer 109 through a duct. According to one example, the exhaust fuel gases are carried into the fuel gas burner 113 for burning with excess air obtained from an air source and with recycled flue gas obtained from a duct 315. The resulting flue gases may be transported to the flue gas quench 117 via a duct. According to one example, recycled flue gas may be introduced into the flue gas quench 117 via a duct 318 in order to cool the resulting flue gases below a melting point of molten salts that are included with the entrained particulates in the resulting flue gases.

According to one example, quench fuel gases may be extracted from the flue gas quench 117 into the heat recovery steam generator (HRSG) boiler 120 via a duct 319. The quench fuel gases transfer a portion of their sensible heat to the pre-heated boiler feed water that passes through the HRSG economizer 259. According to one example, the HRSG boiler 120 also preheats the feed water to the HRSG/ economizer 259 inlet stream 263 temperature specification.

According to one example, a portion of the total flue gas that exits the HRSG boiler 120 may be diverted to the recycled flue gas blower 365 via duct 324. The output recycled flue gas blower 365 may be divided into the various streams via duct 366. For example, the various streams may feed the fuel gas reformer 109 via a duct, the fuel gas burner 113 via the duct 315, the flue gas quench 117 via the duct 318, the primary gasifier 102 via a duct, and the secondary gasifier 106 via a duct.

According to one example, a remaining portion of the total flue gas that exits the HRSG boiler 120 may be directed to the Air Pollution Control Systems #1 ("APCS #1") 126 via an exhaust gas flue duct 325. In the APCS #1 126, dry sorbent may be injected to remove acid gases, electrostatic precipitation may be performed to remove particulates, selective catalytic reaction may be performed to reduce carbon monoxide, and/or selective catalytic reduction may be performed to remove NOx in order to clean the flue gases. According to one example, the exhaust gas flue duct 325 may turn 180°.

According to one example, the exhaust gases from the APCS #1 126 are drafted through the HRSG economizer 259 via a duct 327. The cooled flue gas from the HRSG economizer 259 is then drafted through the Air Pollution Control Systems #2 ("APCS #2") 268. According to one example, the APCS #2 includes activated carbon and performs a dry acid gas treatment or sorbent injection prior to entry into a fabric filter-bag house for final particulate removal. According to one example, the cooled and cleaned flue gas may be drafted into the flue gas blower and stack 370. The flue gas blower and stack 270 may include a blower that discharges the exhaust to the atmosphere through an exhaust stack.

Figure 5:
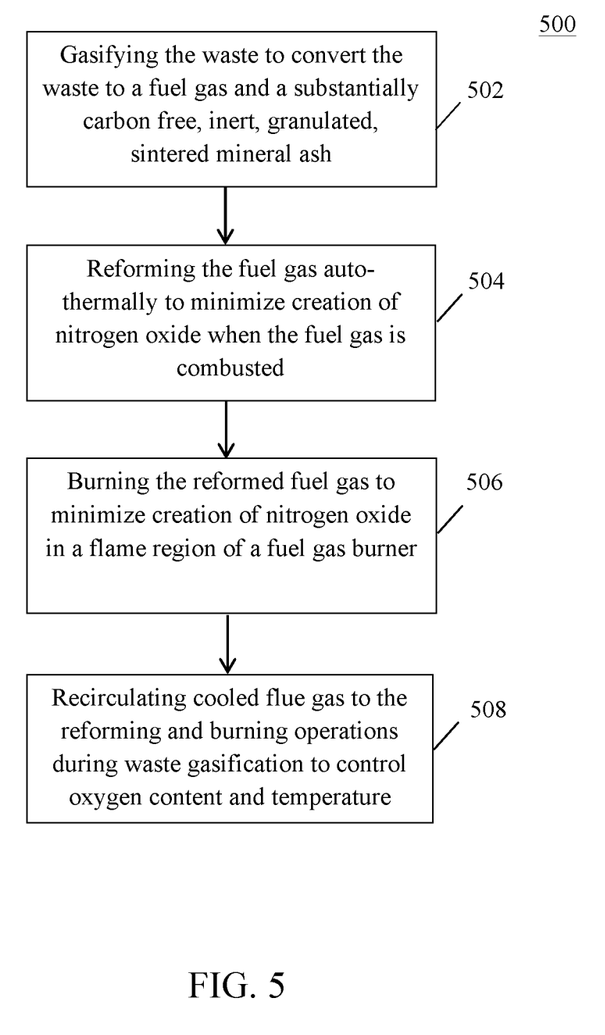
FIG. 5 illustrates a flowchart of an example method according to one example of the disclosure.

FIG. 5 is a flowchart of an example method 500 according to the present disclosure for thermally processing waste to produce steam and generate energy while minimizing air pollutants in a staged thermal reactor. The method 500 may be implemented using the above described systems. For example, the method 500 may be implemented using the multi-stage or a single-stage gasification system. In operation 502, the waste is gasified to convert the waste to a fuel gas and a substantially carbon free, inert, granulated, sintered mineral ash. In operation 504, the fuel gas is reformed auto-thermally to minimize creation of nitrogen oxide when the fuel gas is combusted. In operation 506, the reformed fuel gas is burned to minimize creation of nitrogen oxide in a flame region of a fuel gas burner. In operation 508, the cooled flue gas is recirculated to control oxygen content and temperature during the waste gasification, the reforming operation, and the burning operation. According to one example, sensible heat may be extracted from the cooled flue gas and applied to generate steam.

Figure 6:
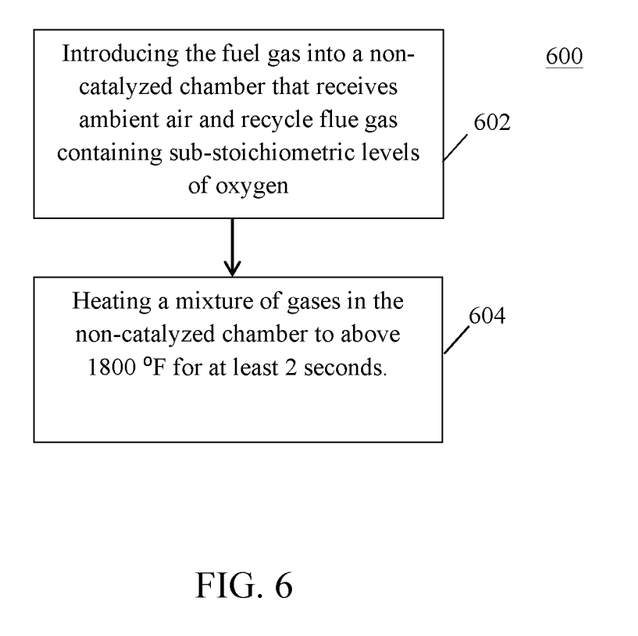
FIG. 6 illustrates a flowchart of an example method according to another example of the disclosure.

FIG. 6 is a flowchart of an example method 600 according to the present disclosure for reforming fuel gas for destruction of contained ammonia. In operation 602, fuel gas is introduced into a non-catalyzed chamber that receives ambient air and recycled flue gas containing sub-stoichiometric levels of oxygen. In operation 604, a mixture of gases is heated in the non-catalyzed chamber to above 1800° F. for at least 2 seconds.

According to one example, flue gas is recirculated to system components in order to maintain temperatures within safe operating ranges for the refractory. For example, the flue gas may be recirculated to the high-temperature starved-air combustor that operates as a reformer of the fuel gases produced in the primary and residue gasifiers. According to one example, the recirculated flue gas may provide a close approach to complete combustion, while sustaining a reducing gas environment and limiting a total energy content of the partially oxidized fuel gases. According to one example, combustion of the relatively tar free fuel gas may be controlled by recirculating the flue gas. This minimizes formation of "thermal" NOx through limiting the localized flame temperature and oxygen content at the flame front in the excess air combustion stage. According to one example, the recirculated flue gas prevents sintering in a shallow fluid bed gasifier. Furthermore, the recirculated flue gas enables control over sintering of the ash residue in the residue gasifier.

According to one example, the technology provides a multi-stage or a single-stage gasification system that decouples combustion stages from the steam production stages. According to one example, this may be accomplished using heat recovery steam generators. According to one example, staged combustion is employed to tightly control both oxygen partial pressure and temperature at each stage to reduce NOx formation. The technology minimizes the use of costly post combustion NOx control devices by employing a novel combination of combustion control devices that reduce NOx emissions through staged combustion using low excess air and flue gas recirculation. According to one example, the technology converts waste-to-energy with benefits of low NOx formation, low tar, low carbon ash, non-leachable ash, boiler tube protection, among other benefits.

The technology described herein operates auto-thermally on high moisture fuels. In other words, the technology uses only the heating value of the waste fuel and does not require additional fuels in order to convert the waste. According to one example, fixed carbon may be rejected from the first thermal reactor and may be conveyed to a secondary gasifier that operates at a higher temperature. The fixed carbon may be converted to fuel gas in the secondary gasifier and may be combusted to generate thermal energy. The thermal energy maybe used to create steam for industrial applications or for generating electrical power, among other applications. In contrast, the fixed carbon that is rejected from the first thermal reactor would be lost in a conventional system.

According to one example, the technology described herein differs from conventional technology at least through use of a second stage high temperature starved air combustor that functions as a reformer of the fuel gases produced in the primary and secondary or residue gasifiers. According to one example, the reformer converts a majority of fuel nitrogen, which predominantly forms ammonia during the primary and residue gasification stages, to relatively inert gaseous nitrogen, $N_2$. To the extent conventional municipal solid waste combustors utilize staging of combustion in which a "starved air" stage follows an "excess air" stage, these systems are limited by a need to avoid slagging while destroying the fuel NOx forming precursors in the "starved air" stage. Furthermore, conventional systems control fuel NOx formation by utilizing plasma torches that reform the ammonia and other nitrogen species to molecular nitrogen. Several drawbacks exist with conventional systems, including cost and/or operating challenges associated with catalytic reforming. For example, catalytic reforming suffers from increased power consumption and maintenance costs.

According to one example, an apparatus is provided that receives waste and generates energy by producing steam from the waste. According to one example, the apparatus minimizing air pollutants by thermally processing the waste to produce a carbon free residual mineral. The apparatus includes a gasifier that receives the waste, recycled flue gas, and air to produce a fuel gas and a reformer that is fluidly coupled to the gasifier, the reformer receives the fuel gas, a first stream of recycled flue gas, and a first stream of air to auto-thermally produce a reformed fuel gas and destroy pollutants in the fuel gas at a first temperature. According to one example, the reformer is non-catalytic. The apparatus further includes a burner that is fluidly coupled to the reformer, the burner receives a second stream of recycled flue gas and a second stream of air to oxidize the reformed fuel gas at a second temperature that prevents formation of nitrogen oxide, the second temperature being lower than the first temperature. The apparatus includes a quench chamber that is fluidly coupled to the burner, the quench chamber receives flue gas from the burner that is quenched with a third stream of recycled flue gas and a boiler that is fluidly coupled to the reformer, the burner, and the quench chamber to provide the first, second, and third streams of recycled flue gas, respectively.

According to one example, the gasifier includes one of a rotary kiln operating with counter current flow of gases and solids, a shallow fluidized bed with fluidized bed height to a diameter ratio of less than 0.1. According to another example, the gasifier includes a secondary gasifier such as a rotary kiln that generates an inert, carbonless sintered ash. According to another example, the gasifier receives underfire air that is preheated by passing over the hot sintered ash that exits the secondary gasifier in order to improve overall process thermal efficiency.

According to one example, the apparatus may include an air pollution control system that is fluidly coupled to the boiler for removal of pollutants from the flue gas of the boiler. According to one example, the air pollution control system may be provided downstream from a point of ammonia injection at a duct length of at least three seconds, wherein the ammonia injection may be used to control nitrogen oxide emissions. According to one example, the apparatus may include a secondary thermal oxidative treatment system that produces a carbonless, inert ash to achieve higher overall process thermal efficiency.

Currently in the U.S.A., 40 CFR 60 Subpart AAAA provides air emissions standards for municipal solid waste (MSW) combustion systems. These guidelines place limits on the concentrations of regulated stack emissions as well as total annual emissions of criteria pollutants. According to the US-EPA AP-42 standards document, NOx emissions for municipal waste combustors are estimated to be 70% to 80% from the nitrogen content of the waste. Fuel NOx has been computed to correspond to be roughly 40% to 50% of the fuel nitrogen content in municipal combustors. Referring to EPA standard AP-42 paragraph 2.1.3.5, which notes that 70%-80% of NOx generation in municipal waste combustors is from fuel nitrogen, the technology described herein enables a 70% to 80% reduction in NOx emissions. Alternatively, power generation capacity may be increased 3.3 to 5 times while maintaining the pre-reduction emissions levels.

Examples are described above with the aid of functional building blocks that illustrate the implementation of specified functions and relationships thereof. The boundaries of these functional building blocks have been arbitrarily defined herein for the convenience of the description. Alternate boundaries can be defined so long as the specified functions and relationships thereof are appropriately performed. While the foregoing illustrates and describes examples of this technology, it is to be understood that the technology is not limited to the constructions disclosed herein. The technology may be embodied in other specific forms without departing from its spirit. Accordingly, the appended claims are not limited by specific examples described herein.

We claim:

1. A method of thermally processing waste to produce steam and generate energy while minimizing air pollutants in a staged thermal reactor, the method comprising:
    gasifying the waste to convert the waste to a fuel gas and a substantially carbon free, inert, granulated, sintered mineral ash;
    reforming the fuel gas auto-thermally in a reforming operation to minimize creation of nitrogen oxide when the fuel gas is combusted;
    burning the reformed fuel gas in a burning operation to minimize creation of nitrogen oxide in a flame region of a fuel gas burner; and
    recirculating cooled flue gas to the reforming operation and the burning operation to control oxygen content and temperature.

2. The method according claim 1, wherein the recirculated cooled flue gas controls a temperature and a fuel gas composition during the reforming operation.

3. The method according claim 1, wherein reforming the fuel gas converts non-molecular nitrogen species into molecular nitrogen in an auto-thermal non-catalytic reformer unit by decomposition reactions promoted by a prevailing reducing gas atmosphere, wherein the higher heating value content of the reformed gases is reduced to minimize forming nitrogen oxide when the fuel gas is combusted.

4. The method according to claim 1, further comprising extracting sensible heat from the cooled flue gas, the sensible heat being applied to generate steam and directing hot exhaust gas from burning the reformed fuel gas into a heat recovery steam generator that produces process steam or steam for generating electrical power.

5. The method according to claim 1, further comprising indirectly transferring hot exhaust gas from burning the reformed fuel gas to a heat transfer fluid in a heat recovery exchanger, wherein the heat transfer fluid is used to generate electrical power in an Organic Rankine Cycle Engine and wherein waste heat recovered from the Organic Rankine Cycle Engine is applied to generate hot water.

6. The method according to claim 1, wherein burning the reformed flue gas includes using a mixture of air and recirculated cooled flue gas to reduce the temperature and oxygen content in the flame region in order to reduce formation of thermal NOx and prompt NOx.

7. The method according to claim 2, wherein reforming the fuel gas includes introducing steam to control the temperature and the fuel gas composition.

8. The method according to claim 1, wherein gasifying the waste is performed in a rotary kiln gasifier.

9. The method according to claim 1, wherein gasifying the waste is performed with at least one of (1) a mixture of air and recirculated cool flue gas, (2) a mixture of air and steam, or (3) a mixture of air, recirculated cool flue gas, and steam.

10. The method according claim 1, wherein reforming the fuel gas and burning the reformed fuel gas is performed in a single chamber or duct.

* * * * *